United States Patent
Leow et al.

(10) Patent No.: US 6,757,119 B2
(45) Date of Patent: Jun. 29, 2004

(54) ADAPTIVE ZONE FREQUENCY COMPENSATION FOR DISC DRIVES

(75) Inventors: SoonWah Leow, Singapore (SG); KokSeng Lim, Singapore (SG); TienHiong Lee, Singapore (SG); KokHoe Chia, Singapore (SG); TeckKhoon Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 291 days.

(21) Appl. No.: 09/896,029

(22) Filed: Jun. 29, 2001

(65) Prior Publication Data

US 2002/0036852 A1 Mar. 28, 2002

Related U.S. Application Data

(60) Provisional application No. 60/222,993, filed on Aug. 4, 2000.

(51) Int. Cl.[7] ............................. G11B 27/36; G11B 5/09
(52) U.S. Cl. ............................. 360/31; 360/53; 360/48
(58) Field of Search ............................. 360/48, 51, 53, 360/75, 212, 46, 31

(56) References Cited

U.S. PATENT DOCUMENTS

| | | | | |
|---|---|---|---|---|
| 5,596,458 A | * | 1/1997 | Emo et al. | 360/48 |
| 5,956,196 A | * | 9/1999 | Hull et al. | 360/65 |
| 6,088,177 A | * | 7/2000 | Onoda et al. | 360/48 |
| 6,195,218 B1 | * | 2/2001 | Guttmann et al. | 360/51 |

* cited by examiner

Primary Examiner—David Hudspeth
Assistant Examiner—Glenda P. Rodriguez
(74) Attorney, Agent, or Firm—Westman, Champlin & Kelly, P.A.

(57) ABSTRACT

A recording surface is segmented into a plurality of radial zones each containing a plurality of concentric tracks on which data may be recorded. The recording surface is initially formatted with a data frequency for each zone such that all of the zones have substantially the same data density. The data frequency is reduced for a first zone whose error rate is initially less than the predetermined error rate so that the first zone exhibits an error rate meeting the predetermined error rate. The data frequency for a second zone whose data transfer error factor initially exceeds the predetermined error rate is increased to restore any loss of storage capacity of the recording surface due to the reduced data frequency in the first zone. As a result, the data density in the first zone is substantially less than a nominal data density and the data density in a second zone is substantially greater than the nominal data density. The data storage capacity of the recording surface is at least as great as a minimum data storage capacity.

24 Claims, 3 Drawing Sheets

ADAPTIVE ZONE FREQUENCY COMPENSATION FOR DISC DRIVES

CROSS-REFERENCE TO RELATED APPLICATION

This application claims benefit of Provisional Application No. 60/222,993, filed Aug. 4, 2000 and entitled "ADAPTIVE ZONE FREQUENCY COMPENSATION SCHEME".

FIELD OF THE INVENTION

This invention relates to data storage devices, and particularly to data storage devices employing rotating storage discs, such as magnetic, magneto-optical and optical disc drives.

BACKGROUND OF THE INVENTION

Most disc drives employ recording techniques known as zone bit recording by which the data recorded in different radial zones are recorded at different data frequencies so that the data density along the concentric tracks is substantially the same in all zones on the disc. More particularly, data are recorded at higher frequencies in outer zones, where the tracks are longer and the lineal velocities are greater, so that the data density is substantially the same in the outer zones as in the inner zones. All tracks in a given zone are recorded at the same frequency, with different recording frequencies assigned to each zone. For example, if a disc contains ten radial zones, there are ten distinct recording patterns, one for each zone, each having a distinct data frequency. Data density is usually expressed in numbers of bits of data per inch (BPI) along the track. Because all tracks within a given zone have the same data frequency, there is a slight variation of the data density between the inner track of a given zone and the outer track of that zone. Notwithstanding the slight variances of data density within a zone, the data density is substantially the same in all zones. Usually the data density for a zone is established by that of the inner-most track of the zone, which has the highest density for the zone. Consequently, the data densities on the inner-most tracks of each zone is usually the same for all of the zones on the disc surface.

Each track includes a plurality of data sectors. Usually all of the data sectors contain the same number of bits, regardless of the track or zone. Hence, the sectors are of equal length, in terms of numbers of bits, and are substantially equal in physical length due to the substantially equal data density. Consequently, the tracks in outer zones contain a greater number of sectors than tracks in inner zones.

Currently, disc drives include a zone table for each recording surface that defines the zones and specifies a BPI setting for the surface. The BPI setting is an expression of the data density, establishes the data frequency for each zone on the surface and the number of sectors per track for each zone. The BPI setting is a standardized setting that establishes the data density, in terms of bits per inch (BPI), for all the entire disc surface. Each BPI setting references a table of data frequencies and numbers of data sectors, for the tracks of each zone. Currently, a single BPI setting is employed for a recording surface, although a given disc drive may include a combination of BPI settings, one for each head/surface combination in the drive.

During qualification of a disc drive, tests are conducted to ascertain that the drive meets required specifications. When a drive fails the qualification test due to poor error rates of recovering data from the recording surface, the drive must be re-worked. In some cases, these poor error rates may appear only from certain zones on the recording surface, and may be due to weak head/surface combinations in those zones. There exists a need to relax the data densities and frequencies in these zones, thereby reducing stress on the heads and improving error rates, and maximizing production yields. Other features and benefits that characterize the present invention will be apparent upon reading the following detailed description and review of the associated drawings.

SUMMARY OF THE INVENTION

In one embodiment, a recording surface of a disc drive that failed to meet a predetermined error rate is re-formatted. The recording surface is segmented into a plurality of radial zones each containing a plurality of concentric tracks on which data may be recorded. The recording surface is originally formatted with a data frequency for each zone such that all of the zones have substantially the same data density. The data frequency is reduced for a first zone whose error rate is greater than the predetermined error rate, and is increased for a second zone whose error rate is less than the predetermined error rate.

In preferred embodiments, the second zone is the zone having the best error rate. The data storage capacity of the recording surface having zones of increased and decreased data density is identified and compared to a required data storage capacity. The second zone data density is increased to increase the data storage capacity of the recording surface to meet the required data storage capacity. Hence, the increased data density of the second zone provides increased data storage capacity to compensate for loss of data storage capacity due to reduction of the data density in the first zone.

In another embodiment, a disc drive has at least one disc having a recording surface segmented into a plurality of radial zones containing pluralities of concentric tracks on which data may be recorded at a data frequency. The data density of tracks in at least one zone is substantially different from the data density of tracks in at least one other zone. More particularly, the recording surface has a nominal data density for all zones that defines a minimum data storage capacity for the recording surface. The data density in a first zone is substantially less than the nominal data density, and the data density in a second zone is substantially greater than the nominal data density. The data storage capacity of the recording surface is at least as great as the minimum data storage capacity.

Other features and benefits that characterize the present invention will be apparent upon reading the following detailed description and review of the associated drawings.

DETAILED DESCRIPTION OF ILLUSTRATIVE EMBODIMENTS

Figure 1:
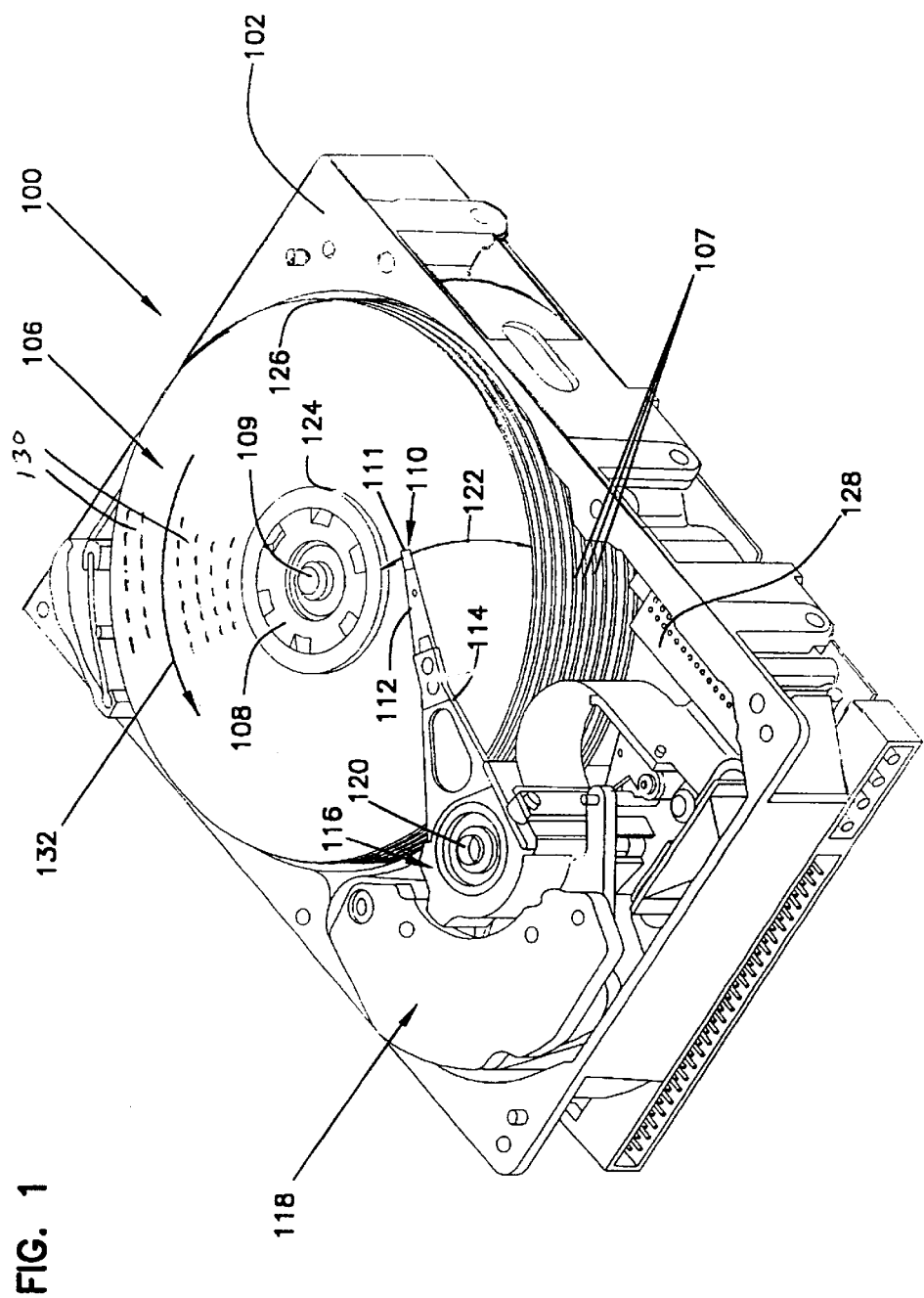
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs 107, which are mounted for co-rotation about central axis 109. Each disc surface has an associated disc head-slider 110 that is mounted to disc drive 100 for communication with the confronting disc surface. Head-slider 110 includes a slider structure arranged to fly above the associated disc surface of an individual disc 107 of disc pack 106, and a transducing head 111 arranged to write data to, and read data from, concentric tracks on the confronting disc surface. In the example shown in FIG. 1, head-sliders 110 are supported by suspensions 112 which are in turn attached to track accessing arms 114 of an actuator 116. Actuator 116 is driven by a voice coil motor (VCM) 118 to rotate the actuator, and its attached heads 110, about a pivot shaft 120. Rotation of actuator 116 moves the heads along an arcuate path 122 to position the heads over a desired data track between a disc inner diameter 124 and a disc outer diameter 126. Voice coil motor 118 is driven by servo electronics included on circuit board 128 based on signals generated by the heads of head-sliders 110 and a host computer (not shown). Read and write electronics are also included on circuit board 128 to supply signals to the host computer based on data read from disc pack 106 by the read heads of head-sliders 110, and to supply write signals to the write head of head-sliders 110 to write data to the discs.

Each recording surface of discs 107 includes a plurality of radial zones 130 each containing a plurality of concentric tracks. Data are recorded in the tracks in data sectors. Usually the data sectors are of uniform size, in terms of numbers of bits, in all of the zones. The data in each zone 130 is recorded at a frequency unique to the zone to achieve as high a data density within the zone as practical. Since the length of a track in an outer zone is longer than the length of a track in an inner zone, the number of data sectors in the outer zone is greater than the number of data sectors in an inner zone.

Current disc drives have predefined zone tables that define the data density, and hence the data frequency, within the zone. The zone table usually reflects the data density by the number of data sectors per track in each zone. The data density is usually referred to in terms of bits per inch, or simply a "BPI configuration". Table I is an example of five different BPI configurations for a disc drive with ten zones, where zone 1 is the outermost zone and zone 10 is the innermost zone. The BPI configurations are defined by standard BPI settings that define the number of data sectors in a track in the zone, and hence the data density.

TABLE I

|  | Zone 1 | Zone 2 | Zone 3 | Zone 4 | Zone 5 | Zone 6 | Zone 7 | Zone 8 | Zone 9 | Zone 10 |
|---|---|---|---|---|---|---|---|---|---|---|
| BPI = 6 | 460 | 440 | 420 | 400 | 380 | 360 | 340 | 320 | 300 | 280 |
| BPI = 7 | 480 | 460 | 440 | 420 | 400 | 380 | 360 | 340 | 320 | 300 |
| BPI = 8 | 500 | 480 | 460 | 440 | 420 | 400 | 380 | 360 | 340 | 320 |
| BPI = 9 | 520 | 500 | 480 | 460 | 440 | 420 | 400 | 380 | 360 | 340 |
| BPI = 10 | 540 | 520 | 500 | 480 | 460 | 440 | 420 | 400 | 380 | 360 |

In prior disc drives, a BPI setting is chosen for each head so that the requirement of the total capacity of the disc drive is met. Once the BPI for each of the heads in the drive is selected, the data disc is configured with the number of sectors per track in each zone established by Table I. For example, if a disc drive has two recording surfaces, and the selected data density for each recording surface is BPI setting 8, the number of sectors per track layout for each of the zones on the surface is given in Table II.

TABLE II

|  | Zone 1 | Zone 2 | Zone 3 | Zone 4 | Zone 5 | Zone 6 | Zone 7 | Zone 8 | Zone 9 | Zone 10 |
|---|---|---|---|---|---|---|---|---|---|---|
| Head 0 BPI 8 | 500 | 480 | 460 | 440 | 420 | 400 | 380 | 360 | 340 | 320 |
| Head 1 BPI 8 | 500 | 480 | 460 | 440 | 420 | 400 | 380 | 360 | 340 | 320 |

Table III shows the total number of physical sectors for each recording surface of the disc drive described in Table II.

TABLE III

| Zones | 1 | 2 | 3 | 4 | 5 | 6 | 7 | 8 | 9 | 10 | Total Physical Sectors |
|---|---|---|---|---|---|---|---|---|---|---|---|
| No of Tracks in Zone | 1550 | 1650 | 1450 | 1700 | 1750 | 1300 | 1350 | 1380 | 1300 | 1270 |  |
| Head 0 BPI 8 | 500 | 480 | 460 | 440 | 420 | 400 | 380 | 360 | 340 | 320 | 6095200 |
| Head 1 BPI 8 | 500 | 480 | 460 | 440 | 420 | 400 | 380 | 360 | 340 | 320 | 6095200 |

As shown in Table III, the disc drive has a capacity of 12,190,400 sectors. Table IV illustrates the results of an error rate test on the drive described in Tables II and III, in which head 0 demonstrates a significantly poorer error rate in zone 3, compared to the other zones. If the limit of the error rates was set at 6.5 (representing $1.0 \times 10^{6.5}$ bits successfully read without an error), then zone 3 of head 0 would have failed the error rate test due to a greater rate of error and the drive would fail the drive certification process.

drive with a single disc with two recording surfaces will be used to describe the invention. It will further be assumed that if the data density in all zones of both recording surfaces have the same data density of BPI setting 8, the storage capacity requirements will be met.

At step 202 an error rate test is performed on the disc drive. The error rate test is a standard test that is conducted

TABLE IV

|        | Zone 1 | Zone 2 | Zone 3 | Zone 4 | Zone 5 | Zone 6 | Zone 7 | Zone 8 | Zone 9 | Zone 10 |
|--------|--------|--------|--------|--------|--------|--------|--------|--------|--------|---------|
| Head 0 | 8.5    | 9.1    | 5.9    | 8.9    | 9.2    | 8.5    | 8.7    | 8.5    | 9.0    | 8.8     |
| Head 1 | 9.3    | 8.9    | 8.9    | 8.6    | 8.5    | 8.8    | 8.6    | 8.4    | 9.0    | 8.9     |

The present invention is directed to a technique to reduce the data density (BPI setting) in the zone 130 where failure occurred, to thereby obtain a more favorable error rate in that zone. The data density (BPI setting) is increased in another zone 130 having a superior error rate so that the storage capacity requirements of disc drive 100 are met.

Table V illustrates experimental results conducted on a 13-zone disc drive configured with different data densities (BPI settings) in each zone. Error rates were found for each zone and each BPI setting, the error rates representing the number of bits of data successfully read from the data disc per single error (e.g., at BPI setting 6, in zone 1 the head successfully read $10^9$ bits without an error).

by positioning the head at a specified off-track position to a test track and reading test data from the track. The number of errors N per $10^x$ bits read (or simply $N \times 10^{-x}$) is a measure of a bit error rate. The error rate is the inverse of the bit error rate expressed in terms of the number of bits successfully read without an error (or $10^x/N$ where N is 1, or simply $10^x$). In the example described herein, the required error rate is $10^{6.5}$, or more simply an error rate of 6.5, which is equivalent to a $1.0 \times 10^{-6.5}$ bit error rate. Ordinarily, the error rate test is one of the qualification tests performed on a disc drive following manufacture to be certain that the disc drive meets required specifications.

In the example the results of the error rate test reveals that a head 111 (FIG. 1) fails to successfully read $10^{6.5}$ bits

TABLE V

| Zone | BPI 06 | Sec/trk | BPI 07 | sec/trk | BPI 08 | Sec/trk | BPI 09 | sec/trk | BPI 10 | sec/trk |
|------|--------|---------|--------|---------|--------|---------|--------|---------|--------|---------|
| 1    | 9.0    | 576     | 9.0    | 576     | 8.6    | 590     | 8.5    | 596     | 8.6    | 604     |
| 2    | 9.5    | 555     | 9.1    | 555     | 9.6    | 576     | 8.5    | 586     | 8.5    | 587     |
| 3    | 9.5    | 540     | 9.5    | 547     | 8.8    | 555     | 9.2    | 576     | 8.3    | 576     |
| 4    | 8.5    | 534     | 8.7    | 540     | 8.5    | 547     | 8.5    | 552     | 6.2    | 576     |
| 5    | 8.8    | 522     | 8.6    | 528     | 8.4    | 534     | 8.8    | 540     | 8.2    | 544     |
| 6    | 9.3    | 504     | 8.8    | 512     | 8.8    | 518     | 8.4    | 528     | 9.4    | 528     |
| 7    | 8.6    | 493     | 8.6    | 493     | 8.4    | 504     | 7.9    | 510     | 8.0    | 514     |
| 8    | 8.4    | 468     | 8.5    | 473     | 8.4    | 480     | 8.0    | 486     | 7.9    | 489     |
| 9    | 8.6    | 442     | 8.8    | 446     | 9.0    | 452     | 7.0    | 456     | 6.6    | 464     |
| 10   | 9.3    | 411     | 9.3    | 411     | 9.1    | 432     | 7.3    | 442     | 7.6    | 442     |
| 11   | 9.3    | 388     | 9.3    | 390     | 9.0    | 396     | 8.7    | 400     | 9.3    | 403     |
| 12   | 8.6    | 366     | 8.6    | 370     | 9.1    | 374     | 9.1    | 378     | 8.7    | 384     |
| 13   | 9.2    | 329     | 9.2    | 336     | 8.2    | 342     | 8.3    | 345     | 8.3    | 349     |
| Average | 9.0 |         | 8.9    |         | 8.7    |         | 7.9    |         | 7.1    |         |

Table V demonstrates that as the track density (BPI setting) increases, the number of sectors per track increases and the error rate deteriorates (from an average of $10^9$ bits read without an error to $10^{7.1}$ bits read without an error).

Figure 2:
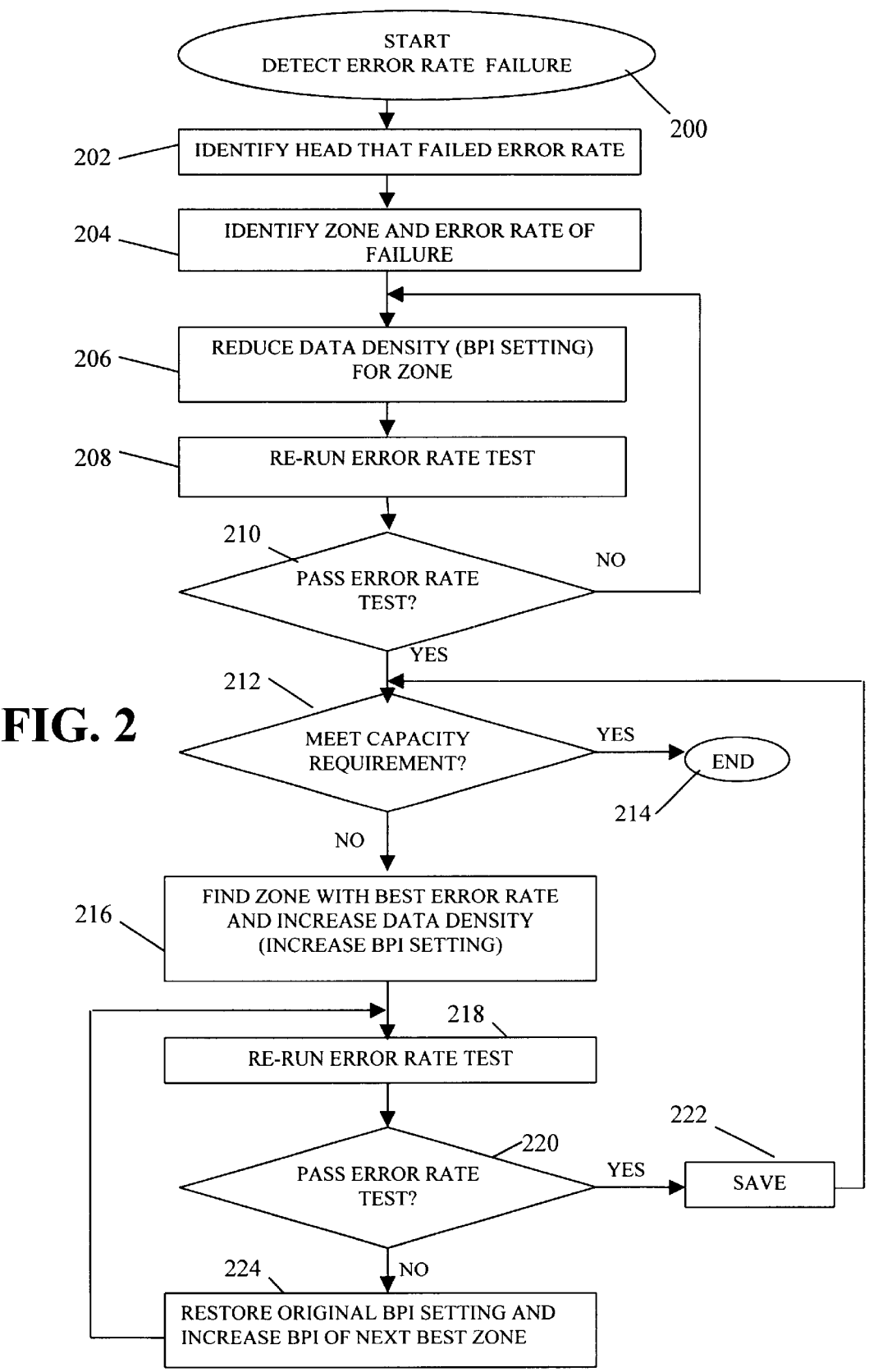
FIG. 2 is a flow diagram of the process of adjusting data densities in zones on a disc in accordance with a preferred embodiment of the present invention.

FIG. 2 is a flow chart of the steps of the process of re-formatting a recording surface by reducing the data density (BPI setting) along tracks in a zone 130 on a disc 107 whose confronting head 111 failed to read data at a rate meeting error rate requirements. The reduction of data density results in a more favorable error rate for that zone. FIG. 2 also includes the steps of increasing the data density (BPI setting) in another zone 130 having a superior error rate so that the storage capacity requirements of disc drive 100 are met.

The process commences at step 200 to detect that a head failed to meet the required error data rate specified for the disc drive. More particularly, the disc drive is initially formatted to a standard data density that meets the storage capacity requirements of the drive. An example of a disc without an error, or some other error rate requirement of the disc drive. Consequently, the drive initially fails the qualification test.

At step 204, the zone and error rate are identified, similar to that shown in Table IV. For example, as shown in Table IV, head 0 has an error rate of 5.9 in zone 3, which is less than the required error rate of 6.5, indicating a greater rate of error.

At step 206, the data density is reduced by reducing the data frequency for the zone confronting the head where the poor error rate occurred. Table VI illustrates an example of the application of the invention to the disc drive described in Tables III and IV. As previously described in Table IV, head 0 in zone 3 had the worst error rate among all the zones confronting head 0. More particularly, head 0 had an error rate of 5.9 when the disc is recorded at BPI setting 8. At step 206, the BPI setting for zone 3 of the disc is reduced to BPI setting 7 (resulting in 440 sectors per track rather than 460 sectors per track—see Table I).

TABLE VI

|  | Zone 1 | Zone 2 | Zone 3 | Zone 4 | Zone 5 | Zone 6 | Zone 7 | Zone 8 | Zone 9 | Zone 10 |
|---|---|---|---|---|---|---|---|---|---|---|
| Head 0 |  |  |  |  |  |  |  |  |  |  |
| BPI 8 | 500 | 480 |  | 440 | 420 | 400 | 380 | 360 | 340 | 320 |
| BPI 7 |  |  | 440 |  |  |  |  |  |  |  |
| Head 1 BPI 8 | 500 | 480 | 460 | 440 | 420 | 400 | 380 | 360 | 340 | 320 |

At step 208, the error rate test is re-run for the zone with its modified data frequency. Table VII illustrates the effect on the error rate on zone 3 with the adjusted BPI setting. If, at step 210 it is found that the error rate test is now passed for the zone, the process continues on to step 212. Otherwise, the process loops back to step 206 to further reduce the data density (BPI setting) for the zone.

As shown in Table VII, with the data density on the disc confronting head 0 reduced to BPI setting 7 in zone 3, the error rate performance of zone 3 improves from 5.9 to 6.7, which meets minimal requirements (maximum permitted rate of error) of 6.5.

TABLE VII

|  | Zone 1 | Zone 2 | Zone 3 | Zone 4 | Zone 5 | Zone 6 | Zone 7 | Zone 8 | Zone 9 | Zone 10 |
|---|---|---|---|---|---|---|---|---|---|---|
| Head 0 | 8.5 | 9.1 | 6.7 | 8.9 | 9.2 | 8.5 | 8.7 | 8.5 | 9.0 | 8.8 |
| Head 1 | 9.3 | 8.9 | 8.9 | 8.6 | 8.5 | 8.8 | 8.6 | 8.4 | 9.0 | 8.9 |

At step 212, the total number of sectors is examined to determine if drive capacity has been met. If it has, the process ends at step 214. Table VIII illustrates the example where drive capacity no longer meets requirements. More particularly, as shown in Table VIII, the total number of physical sectors of the drive after the sector per track adjustment on zone 3 fails to meet the minimum capacity requirement.

TABLE VIII

| Zones | 1 | 2 | 3 | 4 | 5 | 6 | 7 | 8 | 9 | 10 | Total Physical Sectors |
|---|---|---|---|---|---|---|---|---|---|---|---|
| No of Tracks in Zone Head 0 | 1550 | 1650 | 1450 | 1700 | 1750 | 1300 | 1350 | 1380 | 1300 | 1270 |  |
| BPI 8 | 500 | 480 |  | 440 | 420 | 400 | 380 | 360 | 340 | 320 | 6066200 |
| BPI 7 |  |  | 440 |  |  |  |  |  |  |  |  |
| Head 1 BPI 8 | 500 | 480 | 460 | 440 | 420 | 400 | 380 | 360 | 340 | 320 | 6095200 |

To resolve this situation, at step 216 the zone of disc 107 having the best error rating has its data density (BPI setting) increased. As shown in Tables IV and VII, head 0 of the disc drive of the example of Tables III–VIII exhibits a best error rate of 9.2 in zone 5. Consequently, the data density on the disc surface confronting head 0 is increased to BPI setting 9 to increase data density in zone 5 so that 440 data sectors per track appear in zone 5 (increased from 420—see Table II).

The result is illustrated in Table XI.

TABLE XI

|  | Zone 1 | Zone 2 | Zone 3 | Zone 4 | Zone 5 | Zone 6 | Zone 7 | Zone 8 | Zone 9 | Zone 10 |
|---|---|---|---|---|---|---|---|---|---|---|
| Head 0 |  |  |  |  |  |  |  |  |  |  |
| BPI 8 | 500 | 480 |  | 440 |  | 400 | 380 | 360 | 340 | 320 |
| BPI 7 |  |  | 440 |  |  |  |  |  |  |  |
| BPI 9 |  |  |  |  | 440 |  |  |  |  |  |
| Head 1 BPI 8 | 500 | 480 | 460 | 440 | 420 | 400 | 380 | 360 | 340 | 320 |

The result of decreasing the data density in zone 3 and increasing the data density in zone 5, redistributes the stress on head 0 from zone 3 to zone 5.

At step 218, the error rate test is re-run. Table X shows the result of error rate test after the second adjustment, showing that in zone 3 the error rate improved from 5.9 to 6.7 and that the error rate in zone 5, while decreased from 9.2, remained above disc drive requirements at 8.7. This data is saved at step 222 and the process loops back to step 212 to determine if the capacity requirements of the disc drive are met. In the example, the capacity of the disc drive, as reflected in the total number of physical sectors, also meets the minimum capacity specification as shown in Table XI. Consequently, the process ends at step 214.

TABLE X

|  | Zone 1 | Zone 2 | Zone 3 | Zone 4 | Zone 5 | Zone 6 | Zone 7 | Zone 8 | Zone 9 | Zone 10 |
|---|---|---|---|---|---|---|---|---|---|---|
| Head 0 | 8.5 | 9.1 | 6.7 | 8.9 | 8.7 | 8.5 | 8.7 | 8.5 | 9.0 | 8.8 |
| Head 1 | 9.3 | 8.9 | 8.9 | 8.6 | 8.5 | 8.8 | 8.6 | 8.4 | 9.0 | 8.9 |

TABLE XI

| Zones | 1 | 2 | 3 | 4 | 5 | 6 | 7 | 8 | 9 | 10 | Total Physical Sectors |
|---|---|---|---|---|---|---|---|---|---|---|---|
| No of Tracks in Zone | 1550 | 1650 | 1450 | 1700 | 1750 | 1300 | 1350 | 1380 | 1300 | 1270 |  |
| Head 0 Adjusted | 500 | 480 | 440 | 440 | 440 | 400 | 380 | 360 | 340 | 320 | 6101200 |
| Head 1 BPI 8 | 500 | 480 | 460 | 440 | 420 | 400 | 380 | 360 | 340 | 320 | 6095200 |

In the event that an increase in data density in a given zone is insufficient to compensate for the loss in capacity due to the reduction in data density in a poor zone, the next strongest zone will be selected for an increase to the next higher data density (BPI setting) if the error rate requirement for that zone is met. This will ensure the total number of sectors of the drive is at least maintained to meet the drive capacity requirement. Table XII illustrates this example.

TABLE XII

|  | Zone 1 | Zone2 | Zone 3 | Zone 4 | Zone 5 | Zone 6 | Zone7 | Zone 8 | Zone 9 | Zone 10 |
|---|---|---|---|---|---|---|---|---|---|---|
| Head 0 | 8.5 | 8.8 | 5.8 | 8.9 | 9.0 | 9.2 | 8.7 | 8.5 | 9.3 | 8.8 |
| Head 1 | 9.3 | 8.9 | 8.9 | 8.6 | 8.5 | 8.8 | 8.6 | 8.4 | 9.0 | 8.9 |

In Table XII, zone 3 of head 0 has a significantly poor error rate of 5.8 compared to the other zones. Consequently, head 0 will fail the error rate test limit of 6.5 at steps 200–204. As shown in Table XIII, the data density for zone 3 is reduced to BPI setting 7, as described at steps 206–210.

As shown in Table XIV, the data density of zone 9 is increased to BPI setting 9, as described at steps 212–222. Consequently, the number of data sectors per track in zone 3 is reduced to 440 and the number of data sectors per track in zone 9 is increased to 360.

TABLE XIII

|  | Zone 1 | Zone2 | Zone 3 | Zone 4 | Zone 5 | Zone 6 | Zone7 | Zone 8 | Zone 9 | Zone 10 |
|---|---|---|---|---|---|---|---|---|---|---|
| Head 0 BPI Adj | 500 | 480 | 440 | 440 | 420 | 400 | 380 | 360 | 360 | 320 |
| Head 1 BPI = 8 | 500 | 480 | 460 | 440 | 420 | 400 | 380 | 360 | 340 | 320 |

TABLE XIV

|  | Zone 1 | Zone2 | Zone 3 | Zone 4 | Zone 5 | Zone 6 | Zone7 | Zone 8 | Zone 9 | Zone 10 |
|---|---|---|---|---|---|---|---|---|---|---|
| Head 0 | 8.5 | 8.8 | 6.6 | 8.9 | 9.0 | 9.2 | 8.7 | 8.5 | 8.4 | 8.8 |
| Head 1 | 9.3 | 8.9 | 8.9 | 8.6 | 8.5 | 8.8 | 8.6 | 8.4 | 9.0 | 8.9 |

After saving the results at step 222, the process loops back to step 212 to again determine if the drive capacity has been met. Table XV identifies the total number of physical sectors of the drive after making the adjustments. As shown in Table XV, the increase in data density and in storage capacity in zone 9 is insufficient to compensate for the loss of the reduction in storage capacity of zone 3. More particularly, Table XV illustrates that increase of the number of data sectors per track in zone 9 from 340 to 360 data sectors per track is insufficient to compensate for the reduction of the number of data sectors per track in zone 3. Hence, as shown in Table XV, the disc surface confronting head 0 has 6,092,200 data sectors, a reduction of data capacity for the disc surface of 3000 data sectors.

TABLE XV

| Zones | 1 | 2 | 3 | 4 | 5 | 6 | 7 | 8 | 9 | 10 | Total Physical Sectors |
|---|---|---|---|---|---|---|---|---|---|---|---|
| No of Tracks in Zone | 1550 | 1650 | 1450 | 1700 | 1750 | 1300 | 1350 | 1380 | 1300 | 1270 |  |
| Head 0 BPI Adjusted | 500 | 480 | 440 | 440 | 420 | 400 | 380 | 360 | 360 | 320 | 6092200 |
| Head 1 BPI 8 | 500 | 480 | 460 | 440 | 420 | 400 | 380 | 360 | 340 | 320 | 6095200 |

Consequently, at step 212 a determination is made that the drive capacity is not met, and the process continues to step 216 to find the zone with the best error rate (after increase of the data density in zone 9 and the resultant adjustment of the error rate in zone 9 to 8.4—see Table XIV). At step 216, the zone with the best error rate is identified, which is now zone 6 with an error rate of 9.2. The data density in zone 6 is increased to the next higher BPI setting (BPI setting 9). At step 218 the error rate test is re-run on zone 6 for the increased data density. Table XVI illustrates the results of the test.

TABLE XVI

|  | Zone 1 | Zone2 | Zone 3 | Zone 4 | Zone 5 | Zone 6 | Zone7 | Zone 8 | Zone 9 | Zone 10 |
|---|---|---|---|---|---|---|---|---|---|---|
| Head 0 | 8.5 | 8.8 | 6.6 | 8.9 | 9.0 | 8.7 | 8.7 | 8.5 | 8.4 | 8.8 |
| Head 1 | 9.3 | 8.9 | 8.9 | 8.6 | 8.5 | 8.8 | 8.6 | 8.4 | 9.0 | 8.9 |

Comparing the error rates for zone 6 between Table XIV and XVI, the error rate is changed from 9.2 to 8.7, which still meets the minimum requirements of 6.5 for the disc drive. Hence, zone 6 is found to pass the error rate test at step 220 and the results are stored at step 222.

The process again loops back to step 212 to determine if the drive now meets capacity requirements. Table XVII shows that the increased data density (BPI setting 9) for zone 6 increases the number of data sectors from 420 to 440 data sectors per track. Consequently, the storage capacity of the disc surface confronting head 0 is increased to 6,118,200 data sectors, meeting the minimum capacity requirements for the disc drive, as shown in Table XVIII. Consequently, the process ends at step 214.

TABLE XVII

|  | Zone 1 | Zone2 | Zone 3 | Zone 4 | Zone 5 | Zone 6 | Zone7 | Zone 8 | Zone 9 | Zone 10 |
|---|---|---|---|---|---|---|---|---|---|---|
| Head 0 |  |  |  |  |  |  |  |  |  |  |
| BPI 8 | 500 | 480 |  | 440 | 420 |  | 380 | 360 |  | 320 |
| BPI 7 |  |  | 440 |  |  |  |  |  |  |  |
| BPI 9 |  |  |  |  |  | 420 |  |  | 360 |  |
| Head 1 BPI 8 | 500 | 480 | 460 | 440 | 420 | 400 | 380 | 360 | 340 | 320 |

TABLE XVIII

| Zones | 1 | 2 | 3 | 4 | 5 | 6 | 7 | 8 | 9 | 10 | Total Physical Sectors |
|---|---|---|---|---|---|---|---|---|---|---|---|
| No of Tracks in Zone | 1550 | 1650 | 1450 | 1700 | 1750 | 1300 | 1350 | 1380 | 1300 | 1270 |  |
| Head 0 BPI Adjusted | 500 | 480 | 440 | 440 | 420 | 420 | 380 | 360 | 360 | 320 | 6118200 |
| Head 1 BPI 8 | 500 | 480 | 460 | 440 | 420 | 400 | 380 | 360 | 340 | 320 | 6095200 |

In some cases, after increasing the data density (BPI setting) of a zone at step 216 to compensate for the decreased capacity of the drive due to reduction of data density of a poorly performing zone, the reduced data density may cause a failure of the error rate test for the compensating zone at step 220. Should that occur, the original BPI setting is restored for the compensating zone at step 224, and the zone with the next best error rate is selected for the increased data density. Hence, as step 224, the BPI setting is increased for the zone with the next best error rate, and the process loops back to step 218 to re-run the error rate test on the newly-selected zone.

For example, if zone 6 had failed the error rate test with a BPI setting of 9, its original BPI setting of 8 would be restored at step 224 and the zone with the next best error rate (zone 5 with an error rate of 9.0—see Table XVI) will have its BPI setting increased to 9. If the adjustment to zone 5 passes the error rate test at step 220, the results are saved at step 222 and the process loops back to step 212 to identify if drive capacity requirements are met. As shown in Table XIX, drive requirements are met, and the process ends with the density settings set forth in Table XIX.

TABLE XIX

| Zones | 1 | 2 | 3 | 4 | 5 | 6 | 7 | 8 | 9 | 10 | Total Physical Sectors |
|---|---|---|---|---|---|---|---|---|---|---|---|
| No of tracks in Zone | 1550 | 1650 | 1450 | 1700 | 1750 | 1300 | 1350 | 1380 | 1300 | 1270 | |
| Head 0 BPI Adjusted | 500 | 480 | 440 | 440 | 440 | 400 | 380 | 360 | 360 | 320 | 6127200 |
| Head 1 BPI 8 | 500 | 480 | 460 | 440 | 420 | 400 | 380 | 360 | 340 | 320 | 6095200 |

The results stored at step 222 are saved and becomes the BPI setting table for all zones of the disc drive. Hence, for the example of Tables IV and VI–XI, the Table XI becomes the BPI setting table for the disc drive; for the example of Tables XII–XV, Table XV become the BPI setting table; for the example Tables XVI–XVIII, Table XVIII becomes the BPI setting table; Table XIX becomes the BPI setting table in the last example.

The BPI setting table (for example, one of Tables XI, XV, XVIII and XIX) is used to establish the recording frequency for each zone 130 (FIG. 1) of each surface of each disc 107. Consequently, data are recorded by head 111 to the disc surface at the frequency established by the BPI setting table, and are recovered with clock frequencies set by the BPI setting table. The BPI setting table may be stored in a controller (not shown) associated with disc drive 100, or may be stored in a location on one of discs 107 reserved for this purpose. In either case, data frequency, and hence data density, is established for each zone 130 in accordance with the BPI setting table.

Figure 3:
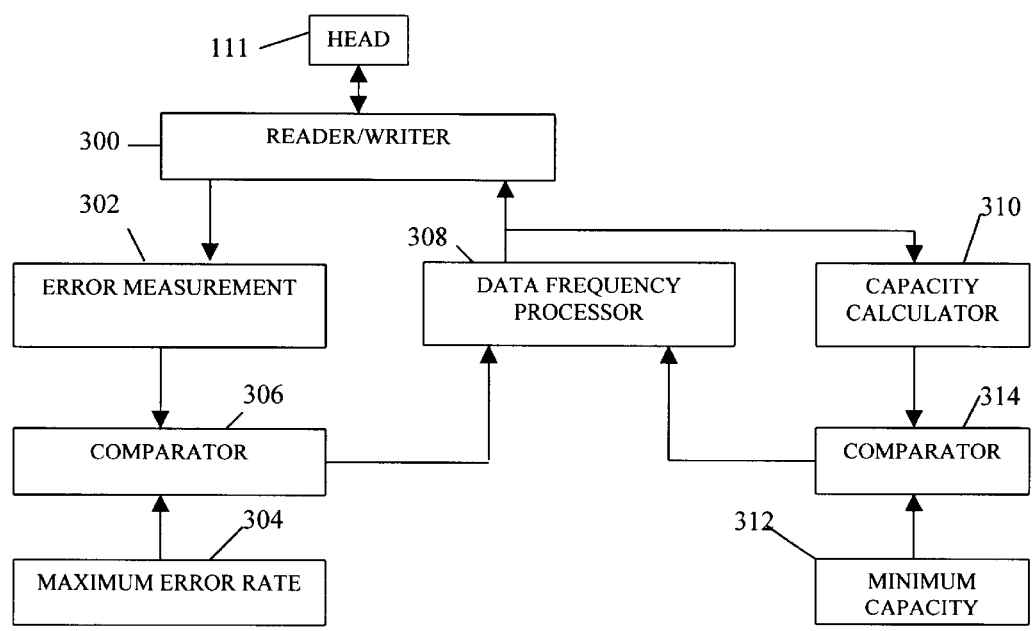
FIG. 3 is a block diagram of apparatus for formatting the data densities of zones according to an embodiment of the present invention.

FIG. 3 illustrates an illustrative embodiment of apparatus for formatting a disc incorporating the principles of the present invention. Read/write head 111 (FIG. 1) is coupled to controller electronics included in circuit board 128. The controller electronics includes reader/writer 300 that establishes the data frequency for each zone on the confronting disc surface. The formatting apparatus includes an error measurement circuit for measuring read errors by head 111. The error measurement is compared to a maximum error rate for the disc drive at 304 by comparator 306. The result is supplied to data frequency processor 308, which in turn selects a data frequency for the zone based on the error measurement, as described above. A test track is written to the confronting disc and read by head 111.

After the data frequency processor has selected data frequencies for each zone to meet error requirements, the capacity of the disc drive is calculated by calculator 310 and compared to the minimum permitted capacity 312 by comparator 314. If the disc drive capacity fails to meet minimum requirements, the processor 308 increases the data frequency for the zone(s) having the best error rate(s). Because the increase in data frequency may adversely affect error rates, the error measurement is re-checked through comparator 306. Upon selection of the data frequencies by processor 308, the resulting data is loaded into reader/writer 300 of the disc drive controller for storage in the controller, or to selected locations on the recording surface of the disc.

Stated alternatively, one embodiment of the invention is a process of formatting a recording surface (107) of a disc drive (100). The recording surface is segmented into a plurality of radial zones (130) each containing a plurality of concentric tracks on which data may be recorded. Each zone is assigned a data frequency so that all of the zones have substantially the same data density. An error rate is measured for each zone and compared to a maximum error rate. The data frequency is reduced for a first zone (zone 3 in the example) whose data transfer error rate exceeds the predetermined maximum error rate (step 206).

In some embodiments, the data density is increased in a second zone (zone 9 and/or 6 in the example) whose data transfer error factor is less than the predetermined maximum error rate (step 216).

In other embodiments, a disc drive (100) has at least one disc (107) having a recording surface segmented into a plurality of radial zones (130) each containing a plurality of concentric tracks on which data may be recorded at a data frequency. The data density of tracks in at least one zone (zone 3 in the example) is substantially different from the data density of tracks in at least one other zone (zone 9 or 6 in the example). In preferred embodiments, the data density (e.g., BPI setting 7) in a first zone (zone 3) is substantially less than a nominal data density (e.g., BPI setting 8), and the data density (e.g., BPI setting 9) in a second zone (zone 9 or 6) is substantially greater than the nominal data density (e.g., BPI 8). The data storage capacity of the recording surface is at least as great as a minimum data storage capacity.

In other embodiments, formatting apparatus includes a writer (300) for writing test data to a track of each zone at a data frequency so that all of the zones have substantially the same nominal frequency. A first processor (302) measures an error rate for each zone and a comparator (306) compares the measured error rate to a maximum error rate (304). A second processor (308) establishes a reduced data frequency for the zone so that the measured error rate is no greater than the maximum error rate.

In some embodiments, a third processor (310) calculates the capacity of the disc drive and causes the second processor (308) to increase the data frequency of another zone having a good error rate to thereby increase the capacity of the drive to a minimum capacity (312).

Although the present invention has been described with reference to magnetic disc drives, those skilled in the art will recognize that the present invention may be practiced with other system modifications, including but not limited to optical and magneto-optical and systems.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, particular elements may vary depending on the particular application for data density varying techniques while maintaining substantially the same functionality without departing from the scope and spirit of the present invention. Thus, while the invention is described in connection with meeting the data storage capacity requirements on each recording surface, the process of distribution of densities might be accomplished by compensating a poor head/surface combination for a zone on one recording surface with a superior head/surface combination in a zone on another recording surface of the same disc drive. In addition, although the invention is described herein is directed to multi-disc disc drives, it will be appreciated by those skilled in the art that the teachings of the present invention can be applied to a single-disc disc drive and to disc drives that might employ data recording on a single surface of one disc, such as dedicated disc drive systems, without departing from the scope and spirit of the invention.

What is claimed is:

1. A disc drive having:
   a storage disc having a recording surface segmented into a plurality of radial zones;
   a plurality of concentric tracks in each zone;
   a data frequency assigned to each zone at which data may be recorded, at least some zones having different data frequencies from other zones; and
   a data density of at least one zone is substantially different from a data density of at least one other zone.

2. The disc drive of claim 1, wherein the recording surface has a data capacity at least as great as a minimum data capacity defined by a nominal data density for all zones, the plurality of zones on the recording surface including
   a first zone having a data density substantially less than the nominal data density, and
   a second zone having a data density substantially greater than the nominal data density.

3. A process of formatting a recording surface of a disc drive, wherein the recording surface is segmented into a plurality of radial zones each containing a plurality of concentric tracks on which data may be recorded, the disc drive further includes a transducer confronting the recording surface to transfer data between the transducer and tracks on the recording surface, the process comprising steps of:
   a) assigning a data frequency for each zone so that all of the zones have a nominal data density that is substantially the same;
   b) measuring an error rate of data transfer between the transducer and at least one track in each zone;
   c) comparing the measured error rates to a predetermined maximum error rate; and
   d) for a zone whose error rate measured in step (b) exceeds the predetermined error rate, establishing a data frequency to define a data density substantially lower than the nominal data density so that an error rate for the zone is no greater than the predetermined error rate.

4. The process of claim 3, wherein the nominal data density is selected to meet a predetermined data storage capacity for the recording surface.

5. The process of claim 3, wherein step (d) comprises steps of:
   e) reducing the data frequency for the zone, and
   f) iteratively repeating steps (b), (c) and (e) until the error rate associated with the zone is no greater than the predetermined error rate.

6. The process of claim 3, further including steps of:
   e) for a zone whose error rate measured in step (b) is less than the predetermined error rate, establishing a data frequency to define a data density substantially greater than the nominal data density with an error rate for the zone no greater than the predetermined error rate.

7. The process of claim 6, further including steps of:
   f) measuring the error rate for at least the zone whose data frequency is established at step (e), and
   g) comparing the error rate from step (f) to the predetermined error rate.

8. The process of claim 7, further including steps of:
   h) identifying a data storage capacity of the recording surface,
   i) comparing the identified data storage capacity to a predetermined data storage capacity,
   j) if the error rate from step (f) is not greater than the predetermined error rate, repeating step (h), and
   k) if the identified data storage capacity is at least as great as the predetermined data storage capacity, formatting the respective zones of the recording surface with the data frequencies established at steps (d) and (e).

9. The process of claim 7, further including steps of:
   h) identifying a data storage capacity of the recording surface,
   i) comparing the identified data storage capacity to a predetermined data storage capacity,
   j) increasing the data frequency for the zone, and
   k) iteratively repeating steps (e) through (j) until the data capacity for the recording surface is at least as great as the predetermined data storage capacity.

10. The process of claim 6, further including steps of:
    f) identifying a data storage capacity of the recording surface,
    g) comparing the identified data storage capacity to a predetermined data storage capacity,
    h) increasing the data frequency for the zone, and
    i) iteratively repeating steps (e) through (h) until the data capacity for the recording surface is at least as great as the predetermined data storage capacity.

11. The process of claim 6, wherein the zone for which the data frequency is established at step (e) is that zone with the least measured error rate.

12. The process of claim 3, wherein step (d) comprises:
    reducing the data frequency for a first zone, and step (e) comprises:
    increasing the data frequency for a second zone.

13. The process of claim 12, wherein step (d) further includes steps of:
    d1) measuring a new error rate for at least the first zone based on the reduced data frequency, and
    d2) comparing the new error rate for the first zone to the predetermined error rate.

14. The process of claim 13, wherein step (d) further includes:
    d3) iteratively reducing the data frequency and repeating steps (d1) and (d2) for at least the first zone until the new error rate meets the predetermined error rate.

15. The process of claim 12, wherein step (e) includes steps of:
    e1) identifying a data storage capacity of the recording surface,
    e2) comparing the identified data storage capacity to a predetermined data storage capacity, and e3) increasing the data frequency for the second zone.

16. The process of claim 15, wherein step (e) further includes steps of:
- e4) measuring a new error rate for at least the second zone, and
- e5) comparing the new error rate for the second zone to the predetermined error rate.

17. The process of claim 16, wherein step (e) further includes steps of:
- e6) if the new error rate for the second zone is no greater than the predetermined error rate, repeating step (e1), and
- e7) if the identified data storage capacity meets the predetermined data storage capacity, re-formatting the zones with the data frequencies from steps (d) and (e3).

18. The process of claim 15, wherein the zone for which the data frequency is increased is that zone with the least measured error rate.

19. Apparatus for formatting a recording surface of a disc drive, wherein the recording surface is segmented into a plurality of radial zones each containing a plurality of concentric tracks on which data may be recorded, the disc drive further includes a transducer confronting the recording surface to transfer data between the transducer and tracks on the recording surface, the apparatus comprising:
- a writer for writing test data to at least one track in each zone at a data frequency for the respective zone so that all of the zones have a nominal data density that is substantially the same;
- frequency means for adjusting a data frequency for a zone having an error rate greater than a predetermined error rate at the nominal data density so that the adjusted data frequency defines a data density substantially lower than the nominal data density and an error rate for the zone is no greater than the predetermined error rate.

20. Apparatus according to claim 19, wherein the nominal data density is selected to meet a predetermined data storage capacity for the recording surface.

21. The apparatus of claim 19, wherein the frequency means comprises:
- a first processor for measuring an error rate of data transfer between the transducer at least one track in each zone;
- a comparator for comparing the measured error rates to a predetermined maximum error rate; and
- a second processor responsive to the comparator identifying an error rate that exceeds the predetermined error rate to establish a data frequency for a first zone that defines a data density substantially lower than the nominal data density so that an error rate for the first zone is no greater than the predetermined error rate.

22. The apparatus of claim 21, wherein the second processor is further responsive to the comparator identifying an error rate that is less than the predetermined error rate to establish a data frequency for a second zone that defines a data density substantially greater than the nominal data density with an error rate for the second zone no greater than the predetermined error rate.

23. The apparatus of claim 22, wherein the first processor is responsive to the second processor to measure the error rate of the second zone.

24. The apparatus of claim 22, further including:
- a third processor for calculating a data storage capacity of the recording surface,
- a second comparator for comparing the identified data storage capacity to a predetermined data storage capacity,
- the second processor being responsive to the second comparator for increasing the data frequency of the second zone until the data capacity for the recording surface is at least as great as the predetermined data storage capacity.

* * * * *